United States Patent
Alha et al.

(10) Patent No.: US 11,771,094 B2
(45) Date of Patent: Oct. 3, 2023

(54) ANTIMICROBIAL POLYMER COMPOSITION

(71) Applicant: PREMIX OY, Rajamäki (FI)

(72) Inventors: Kari Alha, Rajamäki (FI); Kosti Rämö, Rajamäki (FI)

(73) Assignee: PREMIX OY, Rajamäki (FI)

( * ) Notice: Subject to any disclaimer, the term of this patent is extended or adjusted under 35 U.S.C. 154(b) by 0 days.

(21) Appl. No.: 16/621,011

(22) PCT Filed: Jun. 14, 2018

(86) PCT No.: PCT/EP2018/065810
§ 371 (c)(1),
(2) Date: Dec. 10, 2019

(87) PCT Pub. No.: WO2018/229190
PCT Pub. Date: Dec. 20, 2018

(65) Prior Publication Data
US 2020/0196613 A1    Jun. 25, 2020

(30) Foreign Application Priority Data

Jun. 14, 2017 (EP) .................................. 17175923

(51) Int. Cl.
*A01N 65/06* (2009.01)
*A01N 65/10* (2009.01)

(52) U.S. Cl.
CPC .................................. *A01N 65/06* (2013.01)

(58) Field of Classification Search
CPC ....... A61L 2300/404; A61F 2013/8414; A61P 31/00; A01N 65/06; A01N 25/10
See application file for complete search history.

(56) References Cited

U.S. PATENT DOCUMENTS

| | | | |
|---|---|---|---|
| 4,314,851 A | 2/1982 | Ogly Shakhtakhtinsky et al. | |
| 2002/0187176 A1* | 12/2002 | Yao | A61L 9/042 424/405 |
| 2004/0224169 A1 | 11/2004 | Tai et al. | |
| 2005/0020742 A1 | 1/2005 | Chen | |
| 2005/0249791 A1* | 11/2005 | Hobbs | A61L 15/46 424/443 |
| 2005/0272336 A1 | 12/2005 | Chang et al. | |
| 2013/0052249 A1 | 2/2013 | Sipponen et al. | |
| 2013/0115260 A1* | 5/2013 | Sipponen | A61L 27/18 424/405 |

FOREIGN PATENT DOCUMENTS

| | | | |
|---|---|---|---|
| CN | 1965029 | 5/2007 | |
| CN | 101 114 764 | 1/2008 | |
| CN | 102595887 | 7/2012 | |
| CN | 103 242 782 | 8/2013 | |
| CN | 104479199 | 4/2015 | |
| CN | 104910529 | 9/2015 | |
| CN | 105295492 | 2/2016 | |
| EP | 0 795 314 | 9/1997 | |
| GB | 1 384 127 | 2/1975 | |
| JP | 08-277366 | 10/1996 | |
| JP | 09-291254 | 11/1997 | |
| JP | 09-291255 | 11/1997 | |
| JP | 2006-526703 | 11/2006 | |
| JP | 2013-507347 | 4/2013 | |
| RU | 2 005 494 | 1/1994 | |
| RU | 2 456 999 | 7/2012 | |
| WO | WO 99/46326 | * 9/1999 | ............ C08L 23/08 |
| WO | 2010/119638 | 10/2010 | |
| WO | 2013/069365 | 4/2013 | |
| WO | WO 2015/033024 | * 3/2015 | ............ A01P 1/000 |

OTHER PUBLICATIONS

International Search Report and Written Opinion of the ISA for PCT/EP2018/065810 dated Jul. 13, 2018, 12 pages.
Search Report for EP17175923 dated Sep. 13, 2017, 3 pages.
Zhu et al., "Effect of colophony emulsion on the adhesive properties of vinyl acetate/n-butyl acrylate copolymeric latex", Journal of Applied Polymer Science, vol. 107, No. 1, pp. 629-635.
Lasenko et al., "Innovation application: Amber Composite Fibre", https://ortus.rtu.lv, Jan. 1, 2014, p. 1, URL:https://ortus.rtu.lv/science/en/innovations/6.
3m: "3M(TM) ESPE(TM) CavityShield(TM) 5% Sodium Fluoride Varnish SDS", Feb. 25, 2016, pp. 1-10.
Office Action issued in RU Appln. No. 2020100225 dated Jun. 5, 2020 (w/ translation).
Debjani et al., "A "dry and wet hybrid" lithography technique for multilevel replication templates: Applications to microfluidic neuron culture and two-phase global mixing" *Biomicrofluidics*, vol. 5: 24102-1-24102-14 (2011).
Wang et al., "Robust antimicrobial compounds and polymers derived from natural resin acids" *Chem. Commun.*, vol. 48: 916-918 (2012).
Office Action for JP App. No. 2019-569937 (dated Jan. 26, 2021) (w/ translation).
Office Action for CN App. No. 201880039366.6 (dated Jan. 15, 2021) (w/ translation).
Office Action dated Dec. 2, 2021 in corresponding New Zealand Application No. 760136, 5 pages.
Selvin T. Palakattukunnel et al., "Poly(ethylene-co-vinyl acetate)/calcium Phosphate Nanocomposites: Contact Angle, Diffusion and Gas Permeability Studies", Journal of Polymer Research, Nov. 2011, vol. 18, Issue 6, pp. 1277-1285. https://doi.org/10.1007/s10965-010-9530-1.

(Continued)

*Primary Examiner* — Anna R Falkowitz
(74) *Attorney, Agent, or Firm* — Nixon & Vanderhye PC

(57) ABSTRACT

A polymer composition comprising an antimicrobial material for inhibiting the growth of microorganisms in close proximity to said polymer composition. The polymer composition comprises: (a) a polymeric substrate comprising a first polymer and a second polymer, and (b) an antimicrobial material comprising coniferous resin acid(s) dispersed in the polymeric substrate. The water contact angle of the first polymer is not more than 80°.

21 Claims, 10 Drawing Sheets

(56) References Cited

OTHER PUBLICATIONS

C. W. Extrand, "Water Contact Angles and Hysteresis of Polyamide Surfaces", Journal of Colloid and Interface Science, vol. 248, Issue 1, Apr. 2002, pp. 136-142.
Hale Berber Yamak et al., "Improvement of Film Properties of Vinyl Acetate Based Emulsion Polymers by using Different Types of Maleic Acid Diesters", Dec. 2013, Progress in Organic Coatings 76: pp. 1874-1878.
May 24, 2023 Office Action issued in Canadian Patent Application No. 3,066,952, pp. 1-4.
Apr. 19, 2023 Office Action issued in European Patent Application No. 18729692.6, pp. 1-6.

\* cited by examiner

ANTIMICROBIAL POLYMER COMPOSITION

This application is the U.S. national phase of International Application No. PCT/EP2018/065810 filed Jun. 14, 2018 which designated the U.S. and claims priority to EP Patent Application No. 17175923.6 filed Jun. 14, 2017, the entire contents of each of which are hereby incorporated by reference.

BACKGROUND OF THE INVENTION

The invention relates to a polymer composition, containing an antimicrobial material for inhibiting the growth of microorganisms in close proximity to said polymer composition.

The demand for antimicrobial or antibacterial materials is constantly growing. For instance, the emergence of antibiotic-resistant strains of *Staphylococcus aureus* such as methicillin-resistant *S. aureus* (MRSA) is a worldwide problem in clinical medicine.

It has been found that coniferous resin acids possess antimicrobial properties. There is, however, the problem that known thermoplastic materials containing coniferous resins acids have a poor antibacterial resistance, or no resistance at all, against gram positive bacteria, such as *Staphylococcus aureus*.

BRIEF DESCRIPTION OF THE INVENTION

An object of this invention is to provide a novel and an improved material composition having antimicrobial or antibacterial property against gram positive bacteria, such as *Staphylococcus aureus*.

In an aspect, the present invention provides a polymer composition comprising an antimicrobial material for inhibiting the growth of microorganisms, comprising: (a) a polymeric substrate comprising a first polymer and a second polymer, (b) an antimicrobial material comprising coniferous resin acid(s) dispersed in the polymeric substrate, wherein the water contact angle of the first polymer is not more than 80°, specifically not more than 75°, more specifically not more than 70°.

The polymer composition is characterised by what is stated in claim 1. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In another aspect, the present invention provides a method for preparing the polymer composition of the invention, comprising the steps:
providing a first and a second polymer,
providing an antimicrobial material comprising coniferous resin acid(s),
drying the first and second polymers, if necessary,
dispersing the antimicrobial material into the polymeric substrate.

In a further aspect, the present invention provides use of the polymer composition of the invention for inhibiting the growth of microorganisms.

In an aspect, the present invention provides a method of inhibiting the growth of microorganisms in an environment by treating the environment with the polymer composition of the invention.

BRIEF DESCRIPTION OF THE DRAWINGS

Some embodiments illustrating the present disclosure are described in more detail in the attached drawings, in which.

DETAILED DESCRIPTION OF THE INVENTION

Figure 1:
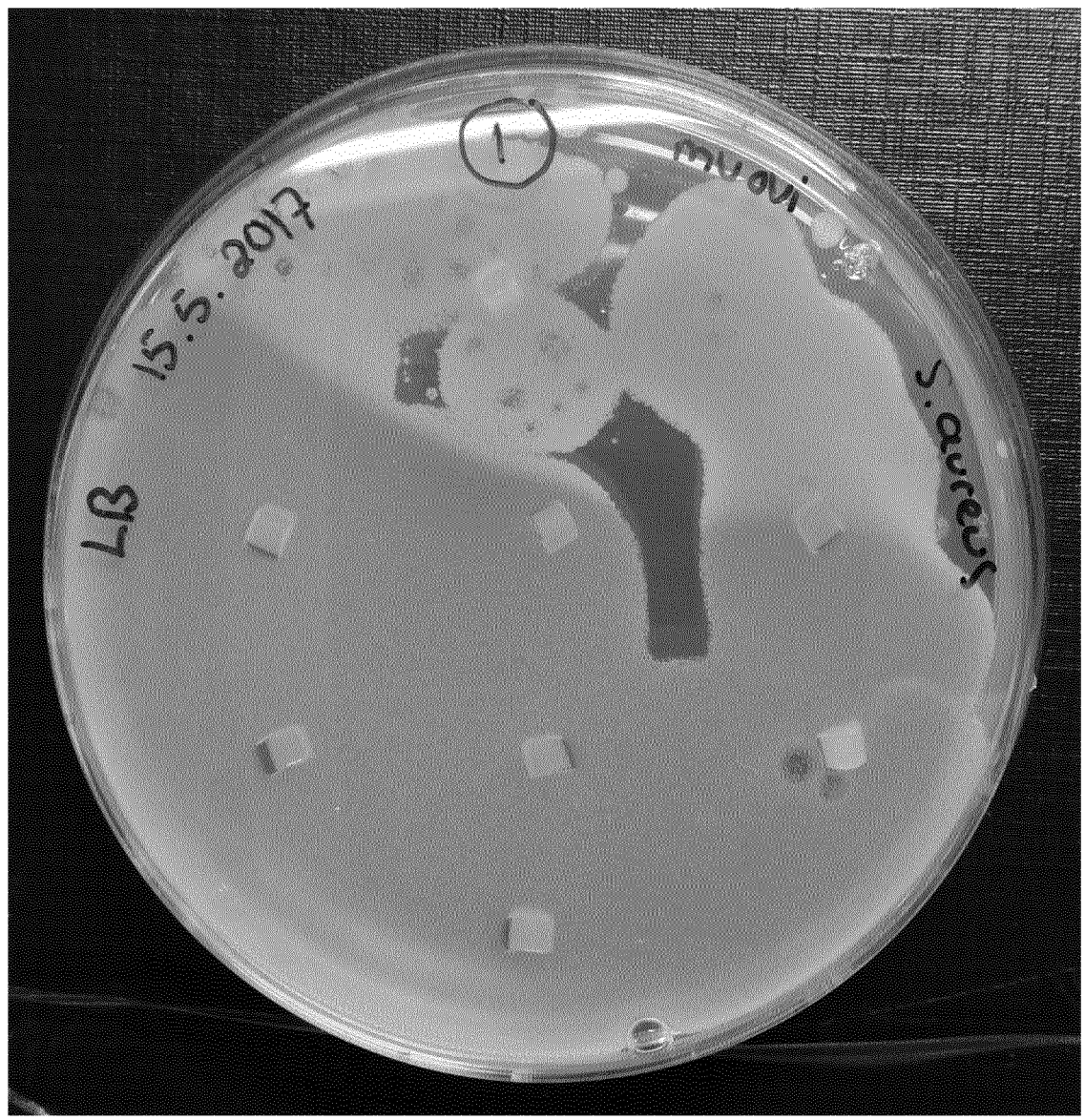
FIGS. 1-9 show test samples made of polymer compositions and arranged in agar gel with *Staphylococcus aureus*.

In an aspect, the present invention provides a polymer composition comprising an antimicrobial material, the polymer composition comprising:
  (a) a polymeric substrate comprising a first polymer and a second polymer,
  (b) an antimicrobial material comprising coniferous resin acid(s) dispersed in the polymeric substrate,
wherein the water contact angle of the first polymer is not more than 80°, specifically not more than 75°, more specifically not more than 70°.

Generally, coniferous resin acid(s) are available in a wide variety of sources. Coniferous resin acids are typically of spruce or pine origin. The resin acids present in spruce and pine comprise various resin acids but are primarily abietic acid type (e.g. abietic acid, dehydro abietic acid) and pimaric acid type (e.g. pimaric acid, isopimaric acid) resin acids.

For example, coniferous resin acids are provided as "resin" or "rosin". According to a definition found in the literature, "resin" is a solid or highly viscous substance of plant or synthetic origin. Resin is usually a mixture of organic compounds. According to a definition, "rosin" is a solid form of resin produced by heating fresh liquid of resin to vaporize the volatile liquid terpene components. Rosin is also called colophony. The terms resin, rosin and colophony are also used synonymously in the literature.

In the present invention, coniferous resin acids can be originated from any source. In an embodiment, the resin acids are provided in a highly viscous form of native resin found on the trunk, stub and branches of coniferous trees. This form of resin acids is called as "resin" in the present invention.

In another embodiment, the resin acids are provided as a resin acid fraction which is enriched with resin acids and is substantially free from volatile terpenes. Minor amounts of fatty acids, p-cumaric acid and lignans can also be included in the rosin. This resin fraction is called as "rosin" in the present invention. The term "rosin" encompasses various grades of rosins including tall oil rosin, gum rosin and/or wood rosin. The tall oil rosin is obtained for example as a by-product from kraft pulping process of wood. Rosins are available as commercial products, for example For90 from Forchem Oyj.

In an embodiment, rosin is used in the method of the invention.

In a further embodiment, the resin acids are provided as a mixture of isolated individual resin acids. Coniferous resin acids can also be a mixture from various sources.

The resin acids can be in a solution, such as tall oil rosin, or in highly solid form, such as native resin, or in powder. The resin acids can be formulated into various forms, such as in granulates and flakes.

The content of resin acids in the antimicrobial material can vary depending on the specific antimicrobial material used. The content of the resin acids in the antimicrobial material varies in the range of 5 wt-% to 98 wt-%. In an embodiment, the content is in the range of 70 wt-% to 96 wt-%. In a further embodiment, the content is in the range of 85 wt-% to 95 wt-%.

As used herein, the term "inherently dissipative polymer" (IDP) means a block copolymer containing polyether, polyamide and polyethylene segments in any arbitrary combination. The IDP thus encompasses a block copolymer of polyether with polyamide, a block copolymer of polyethylene with polyamide (polyethylene block amide), and a block copolymer of polyethylene with polyether.

In an embodiment, it is disclosed a polymer composition, containing an antimicrobial material for inhibiting the growth of microorganisms to said polymer composition, the polymer composition comprising:

(a) a polymeric substrate comprising at least one polymer,
(b) a coniferous resin acid(s) dispersed in the polymeric substrate, wherein the water contact angle of said at least one polymer is not more than 80°, preferably not more than 75°, more preferably not more than 70°.

The water contact angle is measured as disclosed in example 1.

The water contact angle of the first polymer of not more than 80° allows resin acids to diffuse from the polymer composition into an aqueous phase in which the microorganisms are present.

In an embodiment, the first polymer is selected from a group comprising (a) polyamide, such as PA6, (b) inherently dissipative polymer (IDP), such as polyethylene-polyether-copolymer, polyethylene block amide or polyether-polyamide block copolymer, or mixtures of two or more of the above mentioned polymers.

In an embodiment, the first polymer comprises polyamide, such as PA6. An advantage of this embodiment is that the polymeric substrate comprising PA6 has a very low contact angle as such which is an advantage considering the antimicrobial properties. In addition, the melting point of PA6 is one of the lowest among melt spinnable polymers intended for clothing applications. The low melting point of a polymer is an important property when minimizing the thermal degradation of the resin acids fraction, such as rosin, during processing.

In an embodiment, the first polymer comprises polyethylene block amide. An advantage of the embodiment is that polyethylene block amide has a very low contact angle and antimicrobial efficiency without any further modification except rosin addition. Polyethylene block amide is compatible with many plastics and it can be used in e.g. melt spinning process.

In an embodiment, the first polymer comprises inherently dissipative polymer (IDP), such as polyethylene-polyether-copolymer, like Pelestat®. An advantage of the embodiment is that the IDP can convert otherwise non-antimicrobial plastic/resin acid composition to antimicrobial without changing the measured overall contact angle into the desired level of less than 80°. In addition, IDP's are well compatible with various polymers and when used in high concentration they have antistatic properties.

The polymeric substrate further comprises a second polymer. The introduction of the second polymer to the polymeric substrate provides desired properties to the polymeric substrate. For example, the polymeric substrate can exhibit improved impact strength and improved dimension stability. The second polymer can also provide a cost effective manufacture of the polymeric substrate.

The water contact angle of the second polymer is not critical. The water contact angle can be over 80°.

The second polymer is selected from a group comprising (i) polyolefin, such as HDPE and/or PP, (ii) styrene copolymer, such as ABS, (iii) polyester, such as PET and/or PBT, or (iv) thermoplastic elastomer (TPE), or mixtures of two or more of the above mentioned polymers.

In an embodiment, the second polymer is polyolefin, such as HDPE and/or PP. An advantage of this embodiment is that it is possible to manufacture very low cost antimicrobial products from commodity plastics easily available, even as recycled grades, using low processing temperatures. Polyolefins have a wide use temperature range and they are resistant to many chemicals.

In an embodiment, the second polymer is a styrene copolymer, such as acrylonitrile butadiene styrene (ABS). An advantage of the embodiment is that these materials are among the cheapest and most commonly used technical plastics. ABS has an excellent dimension stability and therefore it is used in applications like submersible pump casing. Inhibition of microbes could provide antifouling properties.

In one embodiment, the second polymer is a polyester, such as polyethylene terephthalate (PET) or polybutylene terephthalate (PBT). An advantage of the embodiment is that PET is a commonly used, low price, packaging and textile material. PBT has outstanding electrical properties and high dielectric constant, thus empowering to use the polymer composition in electrical appliances.

In one embodiment, the second polymer is a thermoplastic elastomer (TPE). An advantage of the embodiment is that thermoplastic elastomers often have relatively low processing temperatures which is beneficial considering the possible degradation of the resin acid fraction, such as rosin, during processing. TPE's are used in sealing of water pipes and rosin would inhibit the growth of microorganisms and therefore provide antifouling properties.

The amount of the first polymer in the polymer substrate is at least 2 wt-% of the polymer material of the polymeric substrate. In an embodiment, the amount is at least 2.5 wt-%. In another embodiment, the amount is at least 7.5 wt-%. In a further embodiment, the amount is about 10 wt-%.

The amount of the second polymer component is up to 98 wt-% of the polymeric substrate. In an embodiment, the amount is in the range 1 wt-% to 98 wt-%. In another embodiment, the amount is 5 wt-% to 90 wt-%. In a further embodiment, the amount is 30 wt-% to 70 wt-%.

In an embodiment, the polymeric substrate comprises 10 wt-% of PE-BA and 90 wt-% of HDPE. In another embodiment, the polymeric substrate comprises 45 wt-% of PA6 and 55 wt-% of polyolefins.

In an embodiment, the amount of the antimicrobial material comprising coniferous resin acid(s) is at least 0.1 wt-% (weight percentage) of the polymer composition. In another embodiment, the amount is 1 wt-% to 70 wt-% of the composition. An advantage of the embodiment is that this range can be melt processed and has antimicrobial properties.

In an embodiment, the amount of the coniferous resin acid(s) is 5 wt-% to 15 wt-% of the composition. In a further embodiment, the amount is about 10 wt-%. An advantage of the embodiment is that in this range the antimicrobial and physical properties of composition are optimized.

In one embodiment, the amount of the first polymer is at least 2 wt-% of the polymeric substrate for the modification of water contact angle locally. An advantage of the embodiment is that the second polymer needs not to have the specified water contact angle, when the first polymer has the specified low water contact angle. Composition retains closer the properties of the second polymer.

In one embodiment, the amount of the first polymer is at least 7.5 wt-% of the polymeric substrate. An advantage of the embodiment is that the low ratio of the first polymer to the second polymer allows the antimicrobial efficacy to be optimized.

In another aspect, the present invention provides a method for preparing the polymer composition of the invention, comprising the steps:
  providing a first and a second polymer,
  providing an antimicrobial material comprising coniferous resin acid(s)
  drying the first and second polymers, if necessary,
  dispersing the antimicrobial material into the polymeric substrate.

In a further aspect, the present invention provides use of the polymer composition of the invention for inhibiting the growth of microorganisms.

In an embodiment, the microorganism is bacterium, yeast, fungi or mould. In an embodiment, the bacterium is a gram-positive bacterium. In an embodiment, the gram-positive bacterium is *Staphylococcus aureus*. An advantage of the embodiment is that coniferous resin acids are especially antimicrobial against gram-positive bacteria.

In the following examples, the following materials are used unless stated otherwise:
  ABS: Kumho ABS 750 SW
  HDPE: Hostalen GC7260
  PA6: Promyde B 15 P having water contact angle 66°
  PP: Moplen HP501 M
  PEBA: Pebax MH2030 having a water contact angle 73°
  IDP: Pelestat 230, having a water contact angle 63°
  Gum Rosin: from Respol Resinas SA
  Tall oil rosin: For90 from Forchem Oyj

EXAMPLE 1

Polymer compositions shown in Table 1 were manufactured with a Buss MKS30 type of co-kneader compounder. The polymer materials used in manufacture were dried before compounding. The polymer materials and the resin acid component were fed to a mixer either from one or two feed openings with loss-in-weight feeders. The resultant compositions were extruded into strands and cooled in water bath. The compositions were granulated with a strand cutter.

The compositions were dried in a dehumidifying drier, usually at 80° C. Three types of samples were used in testing the antimicrobial efficacy:
  a) Granulate
  b) Injection moulded plate
  c) Thin fibres

TABLE 1

Water contact angles and antimicrobial efficiencies of different polymers and polymeric substrates containing coniferous resin acid.

| Example | Second polymer | First polymer [wt-%] | Antimicrobial material [10 wt-%] | Water contact angle of the composition [°] | Inhibiting growth of gram-positive bacterium: YES or NOT |
|---|---|---|---|---|---|
| 1 (P)* | ABS | None | Tall oil rosin | 85 | NOT |
| 2 (P) | ABS | 10% IDP | Tall oil rosin | 85 | YES |
| 3 (G)* | HDPE | None | Gum rosin | 85 | NOT |
| 4 (G) | HDPE | 2.5% IDP | Gum rosin | 76 | YES (slightly) |
| 5 (G) | HDPE | 5% IDP | Gum rosin | 85 | YES |
| 6 (G) | HDPE | 7.5% IDP | Gum rosin | 77 | YES |
| 7 (G) | HDPE | 10% IDP | Gum rosin | 74 | YES |
| 8 (F)* | PA6 | None | Gum rosin | 66 | YES |
| 9 (G) | PA6 | 10% PEBA | Gum rosin | 63 | YES |
| 10 (G) | PA6 | 10% IDP | Gum rosin | 65 | YES |
| 11 (F) | HDPE | 45% PA6 | Tall oil rosin | 76 | YES |
| 12 (G)* | PEBA | None | Gum rosin | 73 | YES |
| 13 (G)* | PP | None | Gum rosin | 84 | NOT |
| 14 (G) | PP | 10% IDP | Gum rosin | 81 | YES |
| 15 (G) | PA6 | 1% HDPE | Tall oil rosin | 65 | YES | sample form:
(G) = Granulate,
(P) = Injection moulded plate,
(F) = Fibres
*not according to the invention The water contact angles shown in Table 1 were measured with a contact angle meter CAM100 (KSV Instruments Ltd.) at room temperature from injection moulded plates with as follows: The surface of the test sample was wiped by ethanol and allowed to dry. Then a water droplet was dosed on the wiped surface. The water droplet on the surface was photographed by taking a photo at every 1 second. Ten (10) photos in all were taken. The contact angle was measured in every photo and an average value calculated. The average value is shown in Table 1.

As can be seen in the results "Inhibiting growth of gram-positive bacteria", compositions comprising wherein the polymeric substrate has water contact angle under 80°, preferably not more than 75°, more preferably not more than 70°, have a positive effect, i.e. they are inhibiting growth of gram-positive bacteria. The gram-positive bacterium used in the Example was *Staphylococcus aureus*.

The results also show that the growth of gram-positive bacterium is inhibited when the second polymers having water contact angles exceeding 80°, such as ABS, HDPE, PP, are mixed with the first polymer having a water contact angle under 80°, preferably not more than 75°, more preferably not more than 70°, even if the water contact angle of the polymer composition is over 80°.

FIGS. 1-9 show some test samples made of polymer compositions listed in Table 1 and arranged in agar gel with *Staphylococcus Aureus*.

Figure 2:
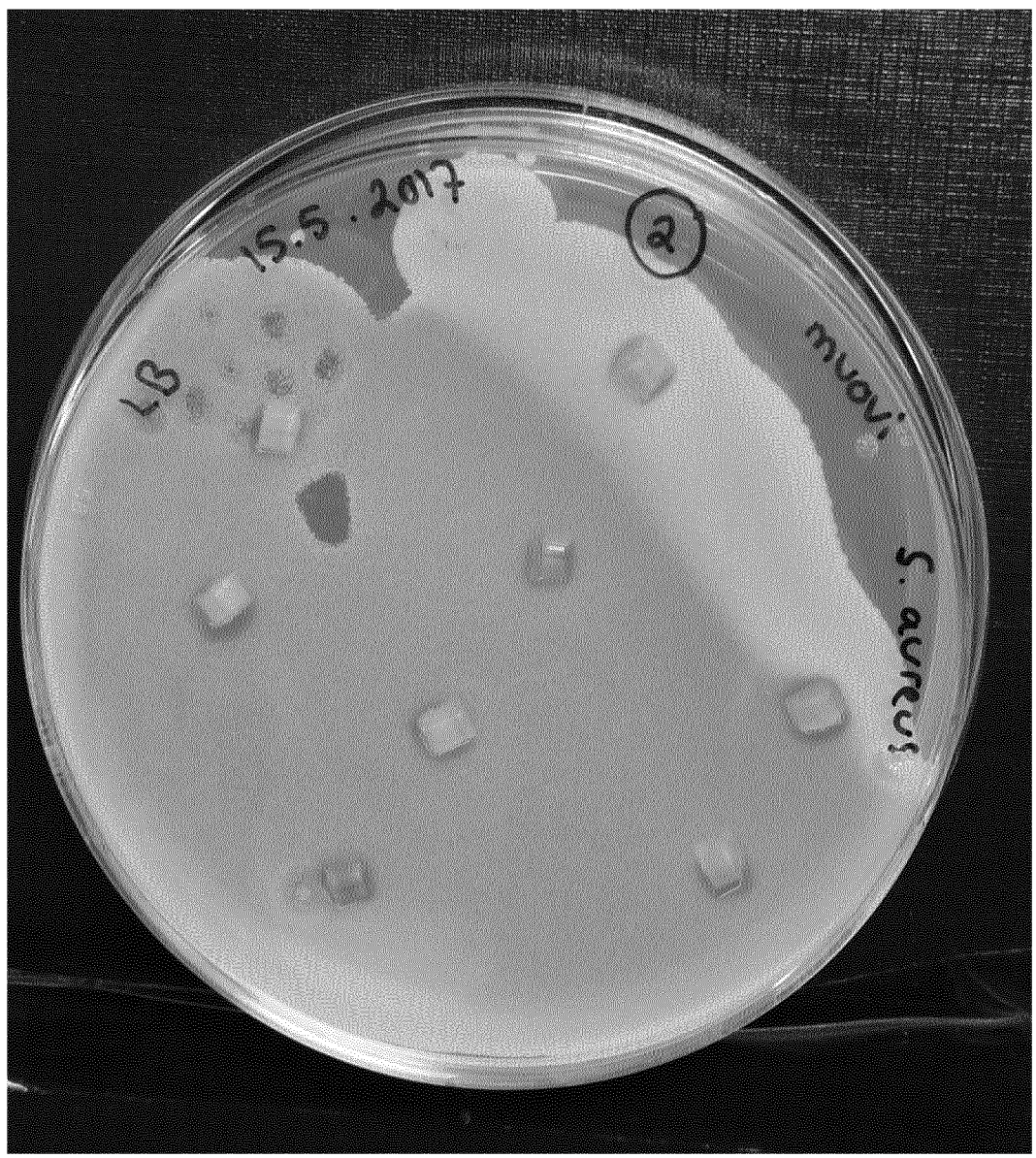
Figure 3:
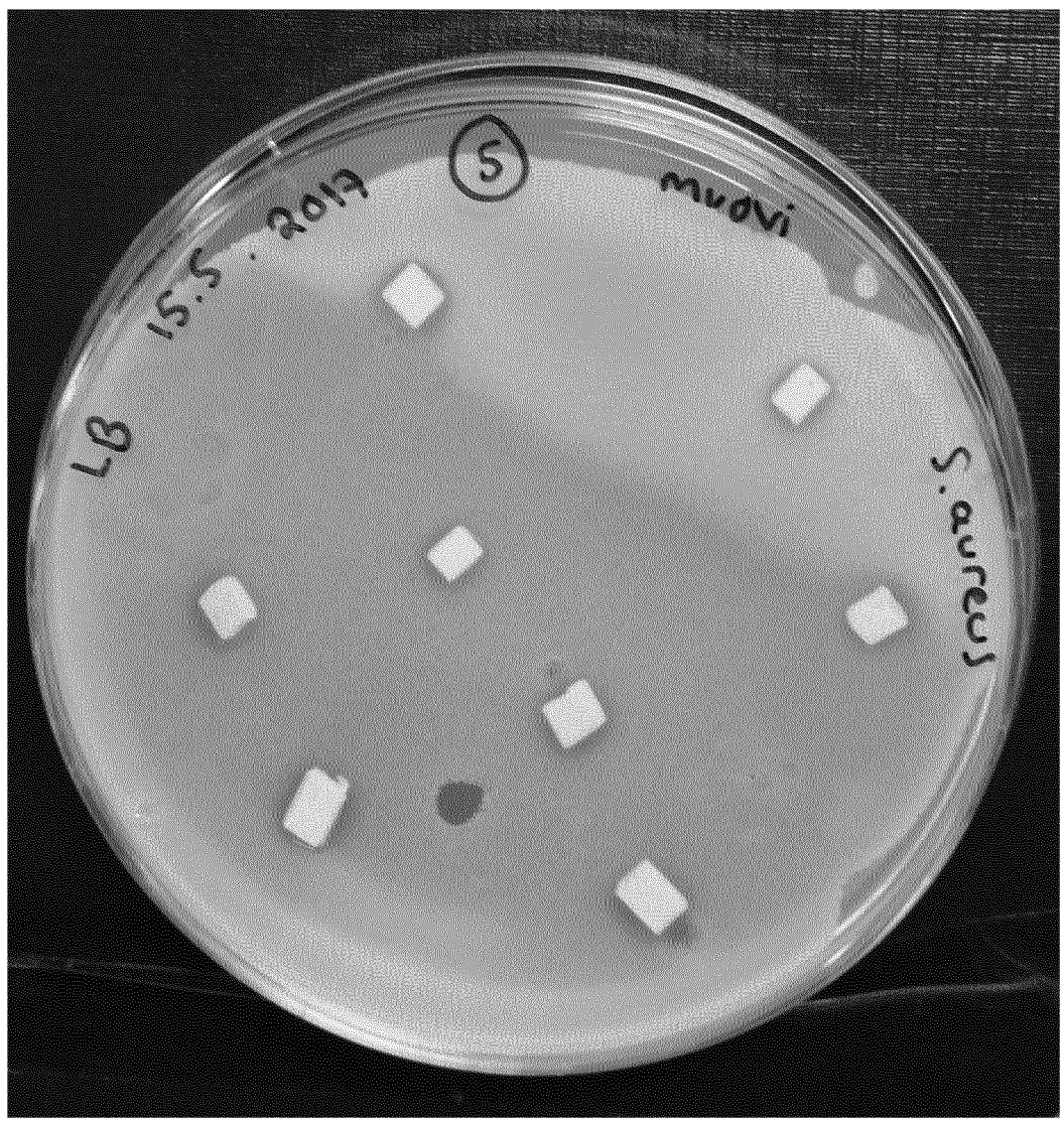
Figure 4:
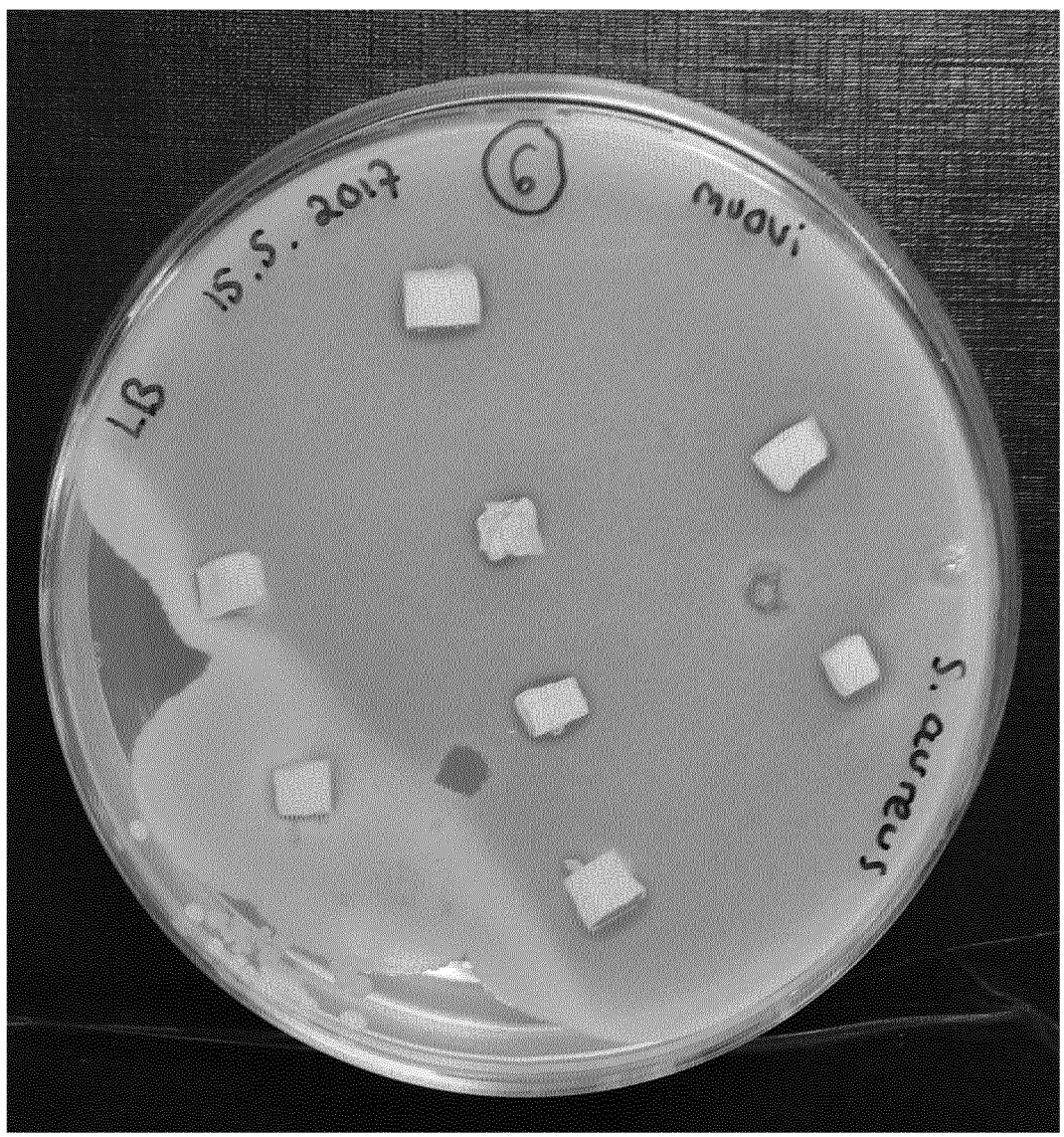
Figure 5:
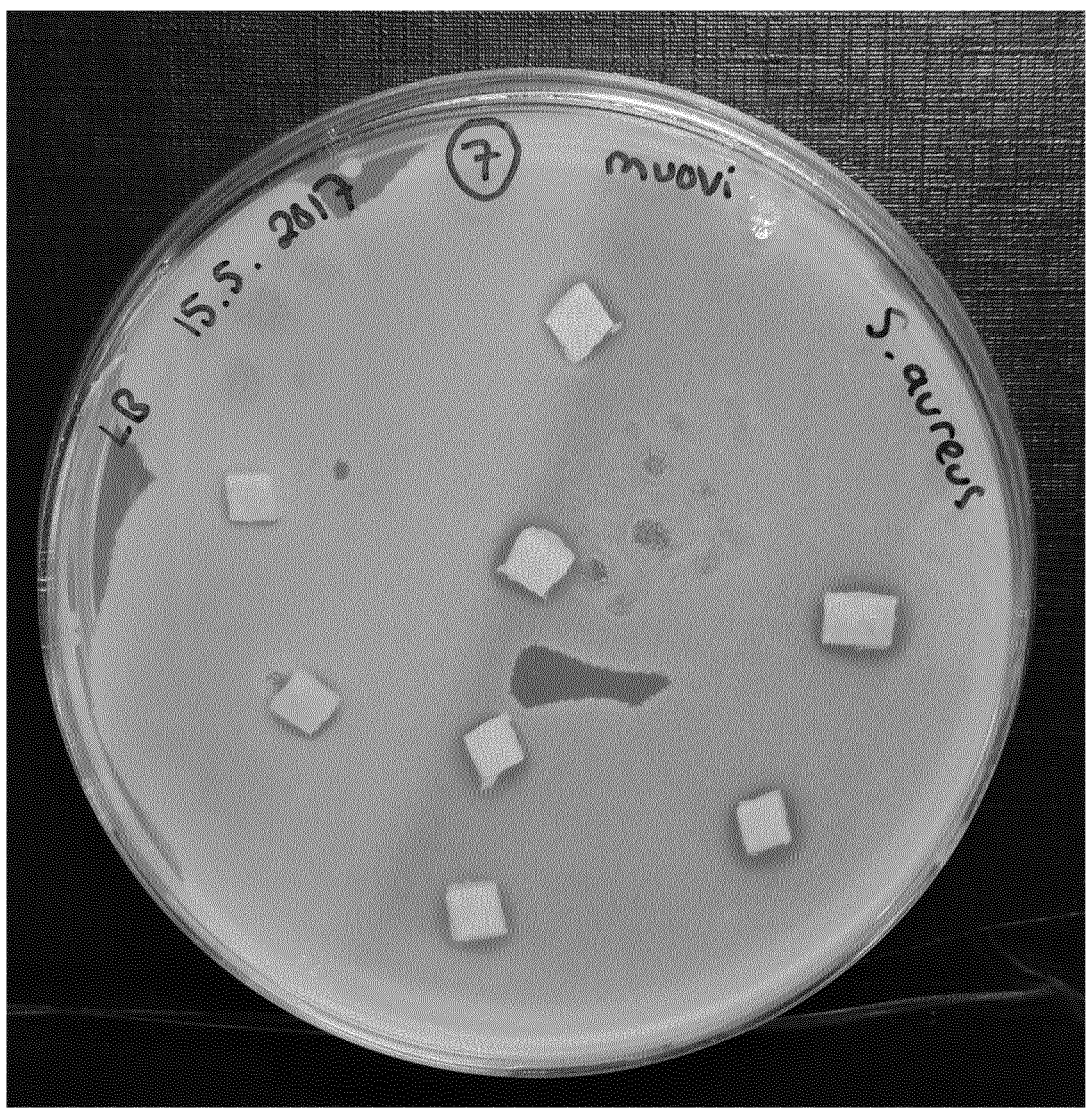
Figure 6:
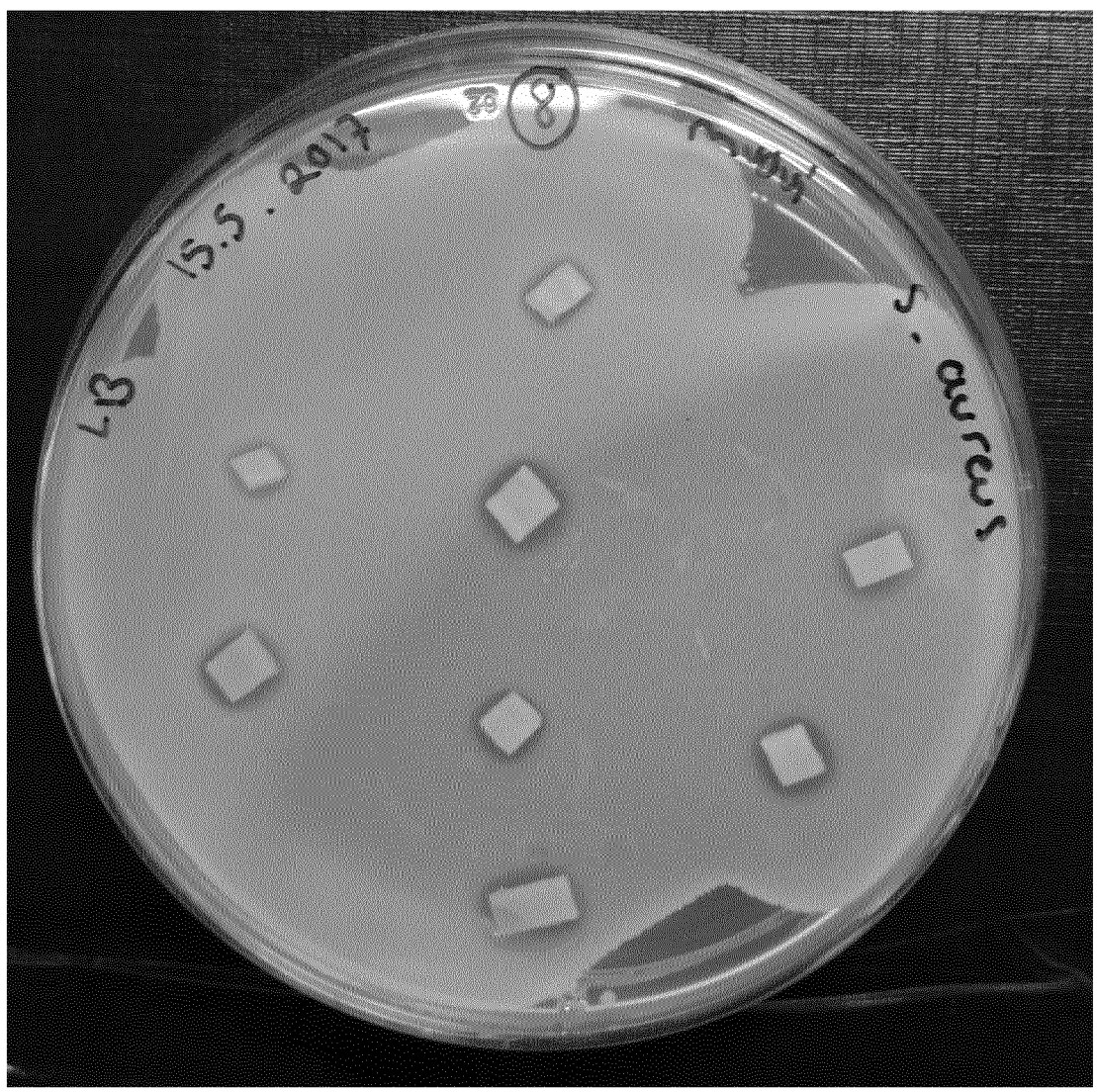
Figure 7:
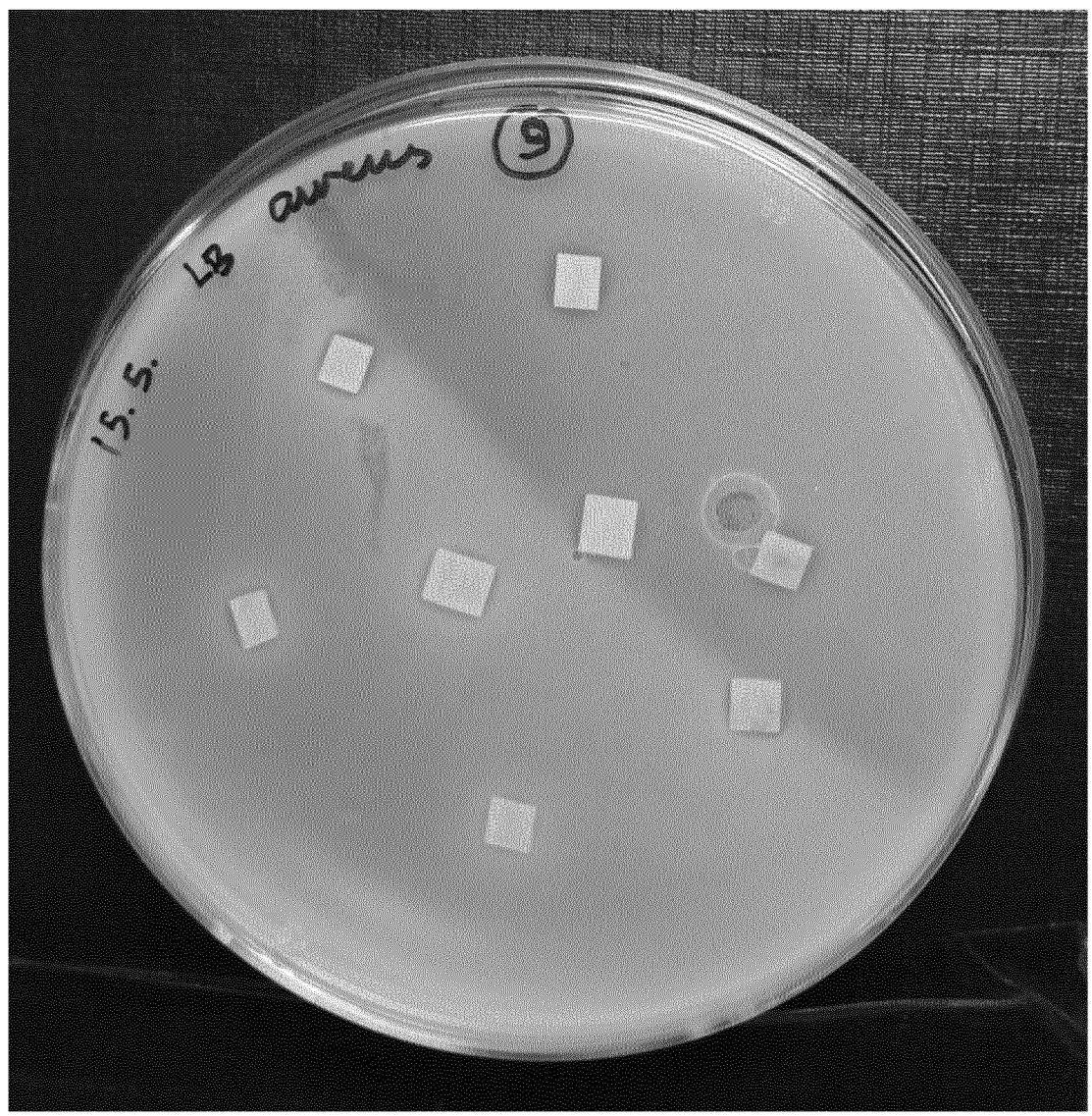
Figure 8:
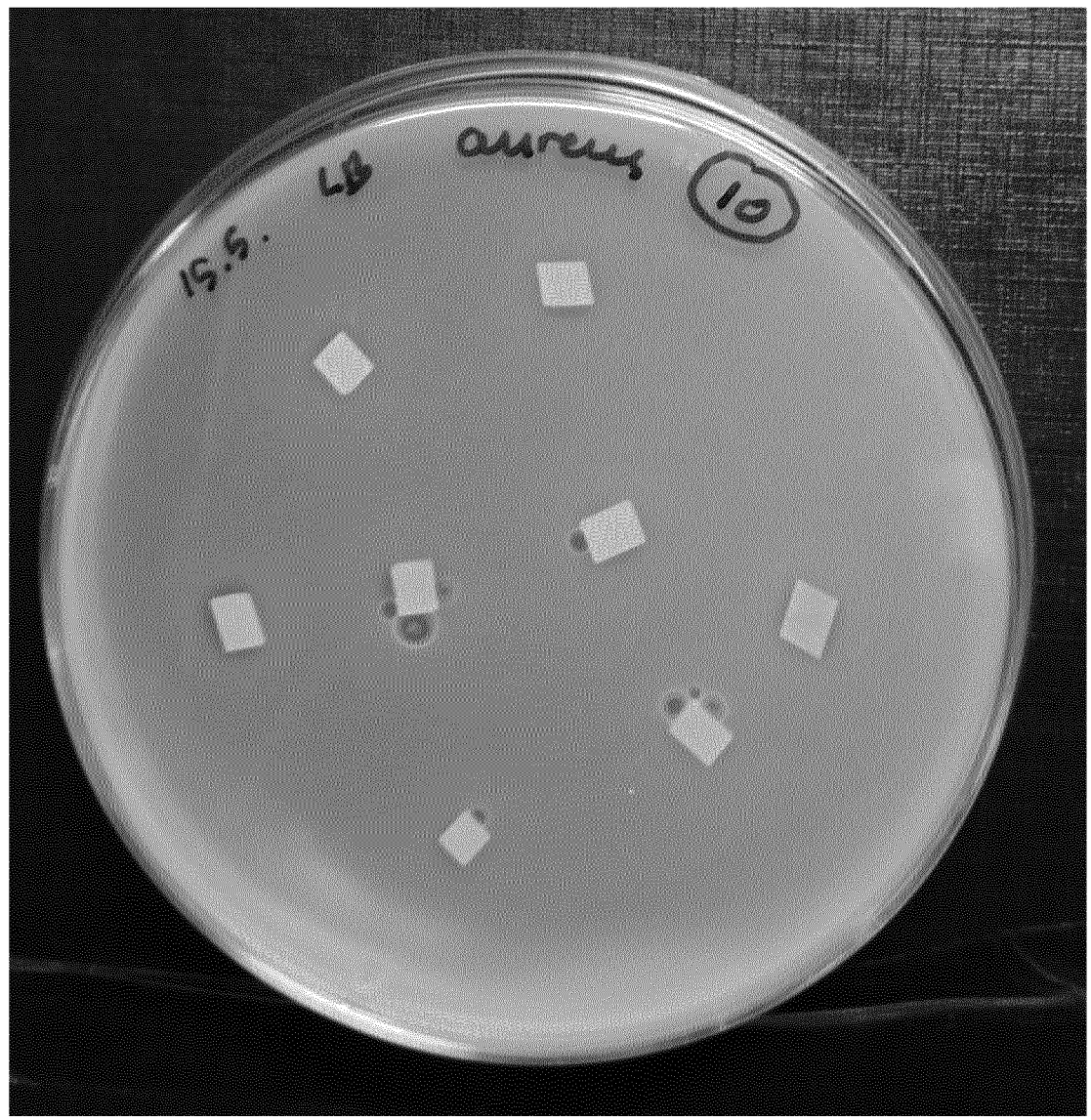
Figure 9:
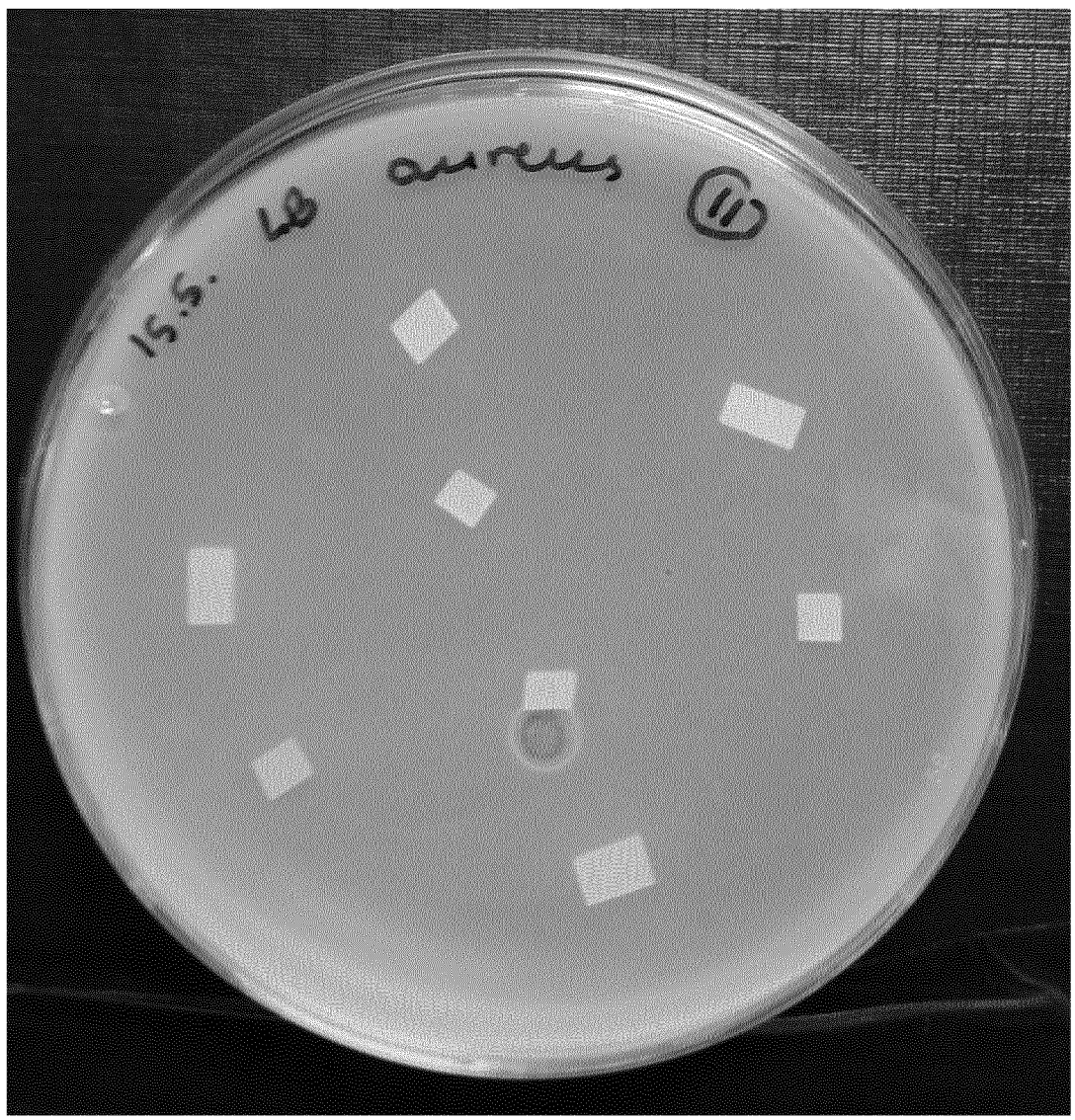

FIG. 1 shows the example 3, i.e. a reference composition.
FIG. 2 shows the example 14.
FIG. 3 shows the example 2.
FIG. 4 shows the example 12.
FIG. 5 shows the example 9.
FIG. 6 shows the example 10.
FIG. 7 shows the example 6.
FIG. 8 shows the example 5.
FIG. 9 shows the example 4.

All the figures show the test samples after 24 hours from the beginning of the test.

Without wishing to be bound by any theory, it is believed that the coniferous resin acid(s) occur(s) in distinct phases as "glands" in the polymer substrate. The "glands" emit coniferous resin acid(s) in water present in the polymer substrate or surroundings of the product made of the polymer composition. The emitted coniferous resin acid(s) at least inhibit(s) and even suppress(es) the microbial or bacterial growth of gram-positive bacteria, yeast, or mould on the polymer composition.

EXAMPLE 2

A polykryptonite polymer composition of HDPE (45 wt-%)+PA6 (45 wt-%)+Coniferous resin acid (10 wt-%) and a reference composition similar to the polymer composition but without PA6 were manufactured same way as in Example 1.

The polymer compositions of Example 2 were processed in fibre-form.

Figure 10:
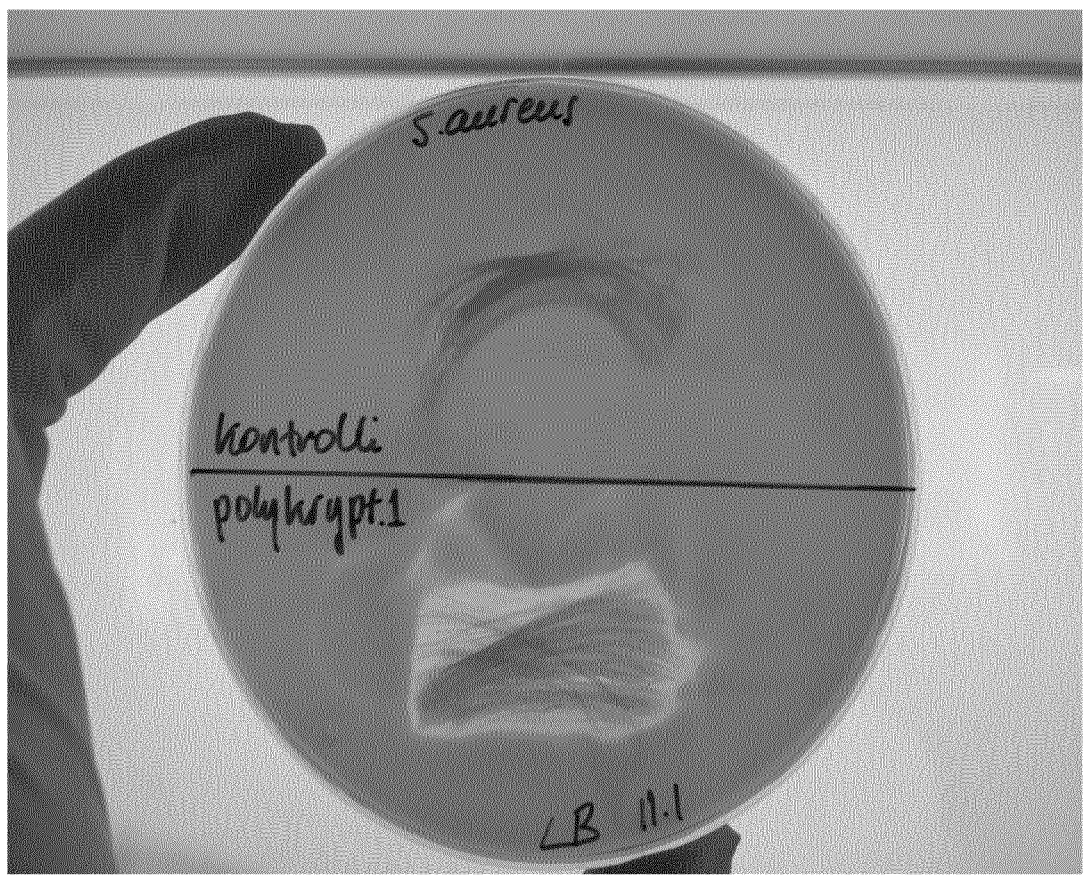
FIG. 10 shows fibres of the polymer compositions of Example 2.

FIG. 10 shows fibres of the polymer compositions of Example 2 arranged in Luria soft -culture medium with *Staphylococcus Aureus*. The test sampies were incubated 20h in the culture medium. The test was performed three times (samples 1, 2 and 3).

The inhibiting effect manifests itself by a clear area around fibre bundles. As can be seen, the HDPE+PA6+ Coniferous resin acid shown in lower half of the dish inhibits *Staphylococcus aureus*, but the composition without PA6 shown in the upper half of the dish does not do so.

Table 2 shows the concentration [pmy/ml] of *Staphylococcus aureus* with the polymer compositions of Example 2.

TABLE 2

|  | 0 hour | 4 hours | 20 hours |
| --- | --- | --- | --- |
| Reference | >$10^{10}$ | >$10^{10}$ | $7.5 \times 10^{8}$ |
| Sample 1 | $1.1 \times 10^{10}$ | $1.0 \times 10^{4}$ | $6.7 \times 10^{3}$ |
| Sample 2 | $1.3 \times 10^{10}$ | $1.0 \times 10^{5}$ | $6.3 \times 10^{3}$ |
| Sample 3 | >$10^{10}$ | $1.3 \times 10^{5}$ | $3.7 \times 10^{3}$ |

One can readily see that the compositions comprising PA6 clearly reduce the concentration of *Staphylococcus aureus*.

The claimed compositions may be used for producing products or semi-finished products having practically any form of plastic products or semi-finished products. The composition may be processed in e.g. fibres, yarns, plates or sheets, coatings of other materials, granules, three-dimensional products. The composition may be used in various forms, such as in solid form or in foamed form.

The composition is very useful in hospitals, clinics or similar environments where methicillin-resistant *S. aureus* (MRSA) may be problem. In those environments, the composition may be used in surfaces of facilities, e.g. in handles, furniture, walls, roofs, equipment, etc., and in instruments, clothes and other products that may be exposed to *S. aureus* (MRSA).

Thus, in an aspect, the present invention provides a method of inhibiting the growth of microorganisms in an environment by treating the environment with the composition of the invention. In an embodiment, the environment includes a surface.

The drawings and the related description are only intended to illustrate the idea of the invention. The invention may vary in detail within the scope of the inventive idea defined in the following claims.

The invention claimed is:

1. A polymer composition consisting of:
   (a) a polymeric substrate consisting of a first polymer and a second polymer,
   (b) an antimicrobial material in an amount of 5 wt-% to 15 wt-% of the polymer composition, the antimicrobial material consisting of coniferous resin acid(s) dispersed in the polymeric substrate,
   wherein the water contact angle of the first polymer is not more than 80° to allow resin acids to diffuse from the polymer composition into a microorganism-containing aqueous phase,
   wherein the first polymer is selected from a group consisting of (a) polyamide, (b) polyethylene-polyether-copolymer, polyethylene block amide, or polyether-polyamide block copolymer, or mixtures of two or more of the above mentioned polymers (a) and (b),
   wherein the second polymer is selected from a group consisting of (i) polyolefin, (ii) styrene copolymer, (iii) polyester, or (iv) thermoplastic elastomer (TPE), or mixtures of two or more of the above mentioned polymers (i), (ii), (iii) and (iv), and
   wherein the amount of the first polymer is 10 wt-% to 50 wt-% of the polymeric substrate, and the amount of the second polymer is 50 wt-% to 90 wt-% of the polymeric substrate.

2. The polymer composition of claim 1, wherein the amount of the first polymer is 10 wt-% to 45 wt-% of the polymeric substrate, and the amount of the second polymer is 55 wt-% to 90 wt-% of the polymeric substrate.

3. The polymer composition of claim 1, wherein the amount of high density polyethylene (HDPE) in the polymeric substrate is 90 wt-%.

4. The polymer composition of claim 1, wherein the polymeric substrate consists of 45 wt-% of polyamide 6 (PA6) and 55 wt-% of polyolefins.

5. The polymer composition of claim 1, wherein the antimicrobial material consists of a resin acid fraction which is substantially free from volatile terpenes.

6. The polymer composition of claim 1, wherein the content of coniferous resin acid(s) in the antimicrobial material is in the range of 5 wt-% to 98 wt-%.

7. The polymer composition of claim 1, wherein the water contact angle of the first polymer is not more than 75°.

8. The polymer composition of claim 1, wherein the water contact angle of the first polymer is not more than 70°.

9. The polymer composition of claim 1, wherein the polyamide is polyamide 6 (PA6).

10. The polymer composition of claim 1, wherein the polyolefin is selected from HDPE, polypropylene (PP) and a mixture thereof.

11. The polymer composition of claim 1, wherein the styrene copolymer is acrylonitrile butadiene styrene (ABS).

12. The polymer composition of claim 1, wherein the polyester is selected from polyethylene terephthalate (PET), polybutylene terephthalate (PBT) and a mixture thereof.

13. The polymer composition of claim 1, wherein the amount of the first polymer is 10 wt-% of the polymeric substrate.

14. The polymer composition of claim 1, wherein the amount of the second polymer component is 55 wt-% to 70 wt-%.

15. The polymer composition of claim 1, wherein the amount of the antimicrobial material is about 10 wt-% of the composition.

16. The polymer composition of claim 1, wherein the content of coniferous resin acid(s) in the antimicrobial material is in the range of 70 wt-% to 96 wt-%.

17. The polymer composition of claim 1, wherein the content of coniferous resin acid(s) in the antimicrobial material is in the range of 85 wt-% to 95 wt-%.

18. The polymer composition of claim 1, wherein the first polymer is not water-soluble.

19. The polymer composition of claim 1, wherein the first polymer and the second polymer are co-kneaded into the polymeric substrate.

20. A method for preparing the polymer composition of claim 1, the method comprising:
providing the first and the second polymer,
providing the antimicrobial material consisting of the coniferous resin acid(s),
optionally drying the first and second polymers, and
dispersing the antimicrobial material into the polymeric substrate.

21. A method of inhibiting the growth of microorganisms in an environment by treating a surface of the environment with the composition of claim 1.

* * * * *